June 1, 1943.　　　　　G. F. ILGEN　　　　　2,320,933
APPARATUS FOR REMOVING MATERIAL FROM CONTAINERS
Filed May 17, 1941　　　　5 Sheets-Sheet 2
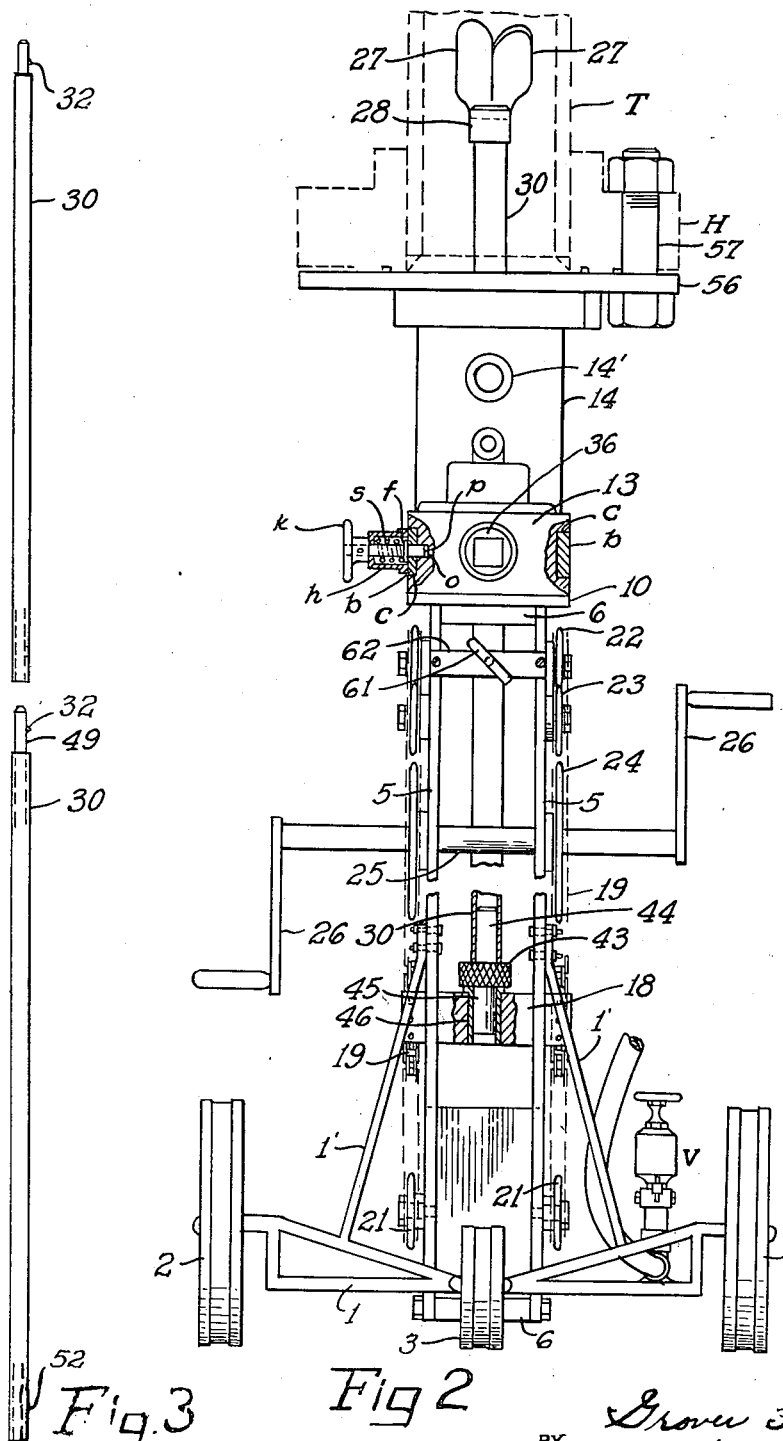
Fig. 2
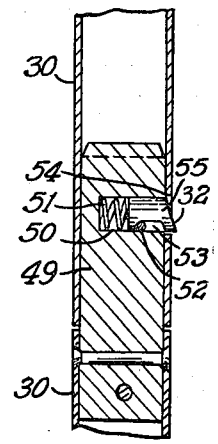
Fig. 4
Fig. 3
INVENTOR.
Grover F. Ilgen
BY
Staley & Welch
ATTORNEYS

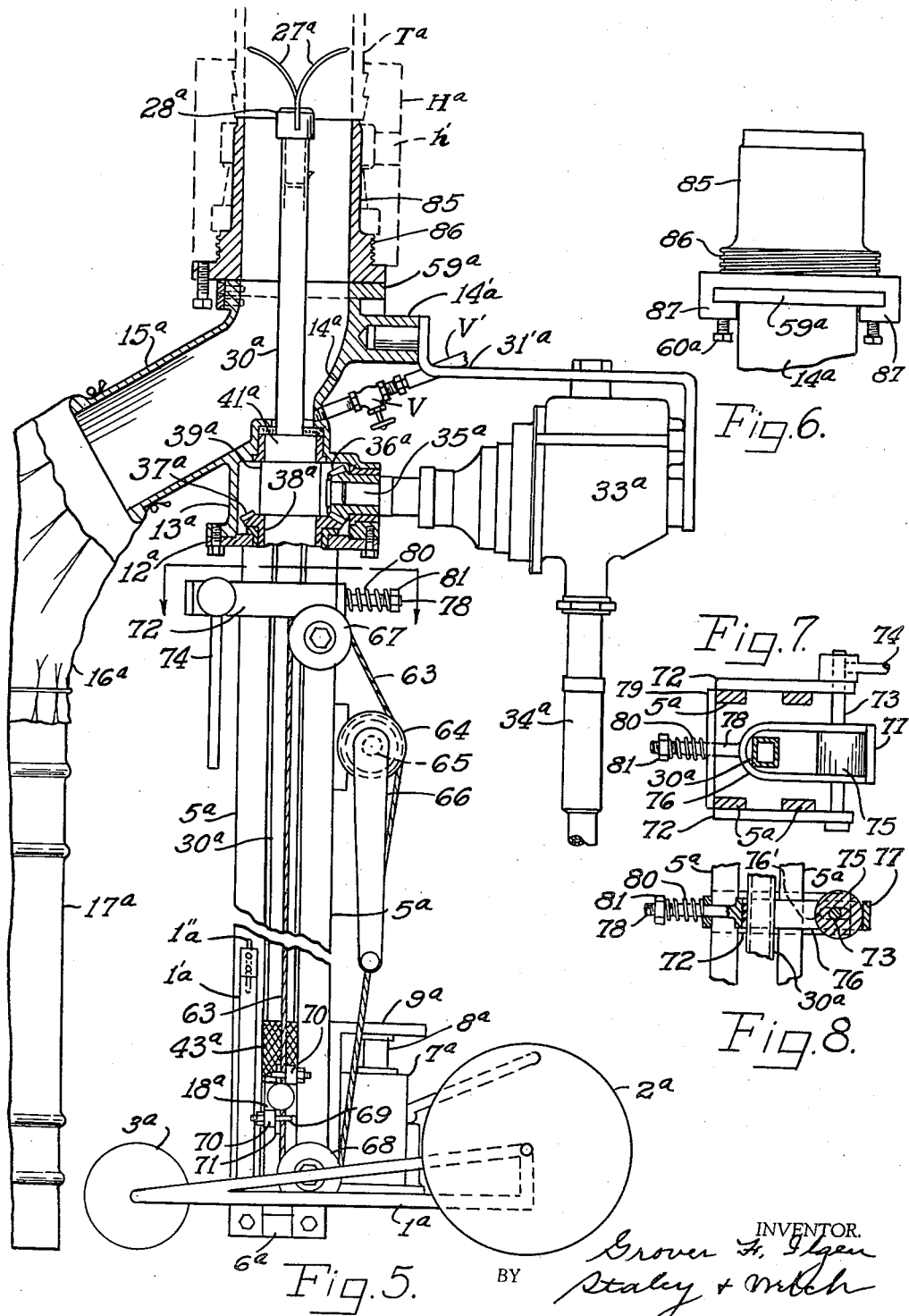

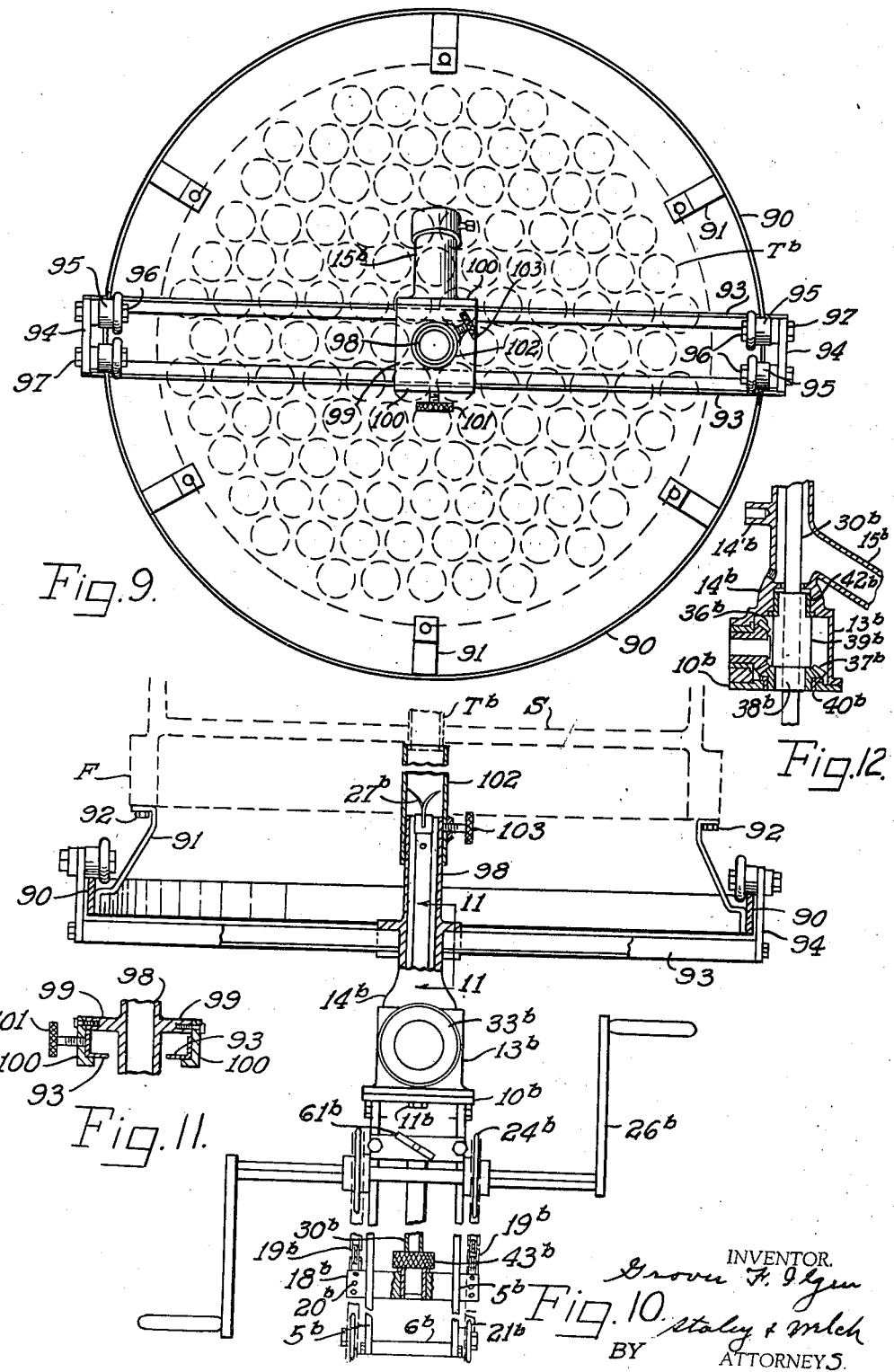

June 1, 1943.  G. F. ILGEN  2,320,933
APPARATUS FOR REMOVING MATERIAL FROM CONTAINERS
Filed May 17, 1941  5 Sheets-Sheet 5
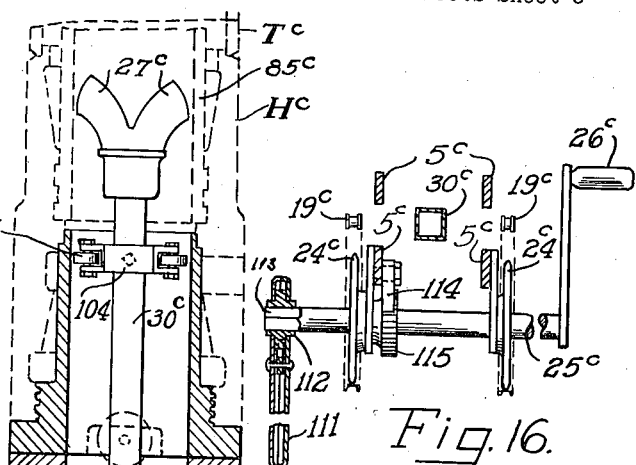
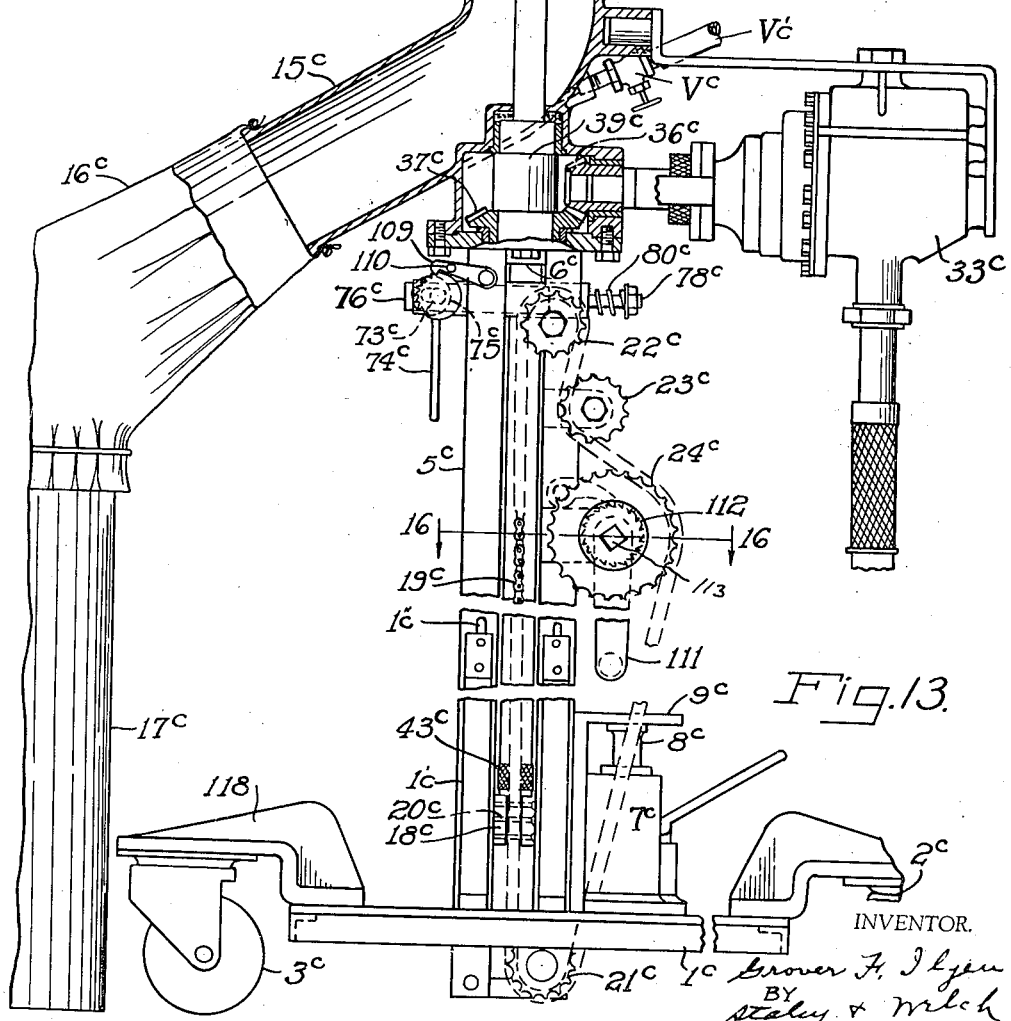
INVENTOR.
Grover F. Ilgen
BY
Staley & Welch
ATTORNEYS Patented June 1, 1943

2,320,933

UNITED STATES PATENT OFFICE 2,320,933

APPARATUS FOR REMOVING MATERIAL FROM CONTAINERS

Grover F. Ilgen, Springfield, Ohio, assignor to The Airetool Mfg. Company, Springfield, Ohio, a corporation of Ohio Application May 17, 1941, Serial No. 393,981

8 Claims. (Cl. 83—6)

This invention relates to cleaners for tubes, chambers or other like containers, it more particularly relating to a cleaner adapted to remove a body of material from a container which substantially fills the same, such for instance as the removal of catalysts from the tubes or chambers of apparatus for refining gasoline.

In the production of high octane fuel for aircraft and other purposes, use has been made of catalysts in metallic reactor tubes or chambers through which the gasoline is forced. As these catalysts become spent in time it is necessary to remove them from the tubes or chambers and new catalysts installed therein. The removal of the spent catalysts has presented a problem in the proper cleaning and disposal of the spent catalysts from the reactor tubes, chambers or other containers of the refining apparatus and also a hazard when the dust is not removed from the surrounding atmosphere, as this dust is particularly harmful to body tissues and to the skin of employees whose duty it is to operate the cleaning equipment or at work on units adjacent to the cleaning operations.

The usual form of tube cleaner heads and cutters is not adapted for the removal of material from tubes or other containers which substantially fills the containers, such as catalysts, as such tube cleaners are only adapted to remove encrustations which have collected upon the interior of the tubes but not filled the tube.

One of the objects of the invention is to provide tube cleaning apparatus which will effectively remove a body of material which substantially fills a tube or other container such as catalysts in the containers of gasoline refining apparatus.

A further object of the invention is to provide means in a cleaning apparatus of the kind referred to which will collect the dust resulting from the cleaning operation and deposit it in a suitable receptacle to eliminate the danger of the dust coming in contact with the bodies of the workers who have charge of the cleaning operation or workers in the immediate vicinity of the cleaning operation.

A further object of the invention is to provide a valve controlled air jet in the dust collecting chamber whereby clogging of the dust and disintegrated material in the chamber will be eliminated.

Further objects of the invention will appear from the accompanying drawings, description and claims.

In the accompanying drawings:

Fig. 2 is a rear elevation with parts thereof shown in transverse section, the motor being omitted.

Fig. 3 is a vertical section showing the manner of connecting two members of the sectional cutter operating shaft.

Fig. 4 is an elevation of two members of the sectional cutter operating shaft after they are connected together.

Fig. 5 is a view partly in side elevation and partly in longitudinal section showing modifications.

Fig. 6 is a rear elevation illustrating a modified form of connection between the cleaning apparatus and the tube that is to be cleaned.

Fig. 7 is a plan view of a modified form of lock for the cutter operating shaft illustrated in Fig. 5, the supporting frame being shown in section.

Fig. 8 is a transverse section on the line 8—8 of Fig. 7.

Fig. 9 is a top plan view of a modification of the carriage which supports the apparatus, with a plurality of the catalysts tubes and their casing shown in broken lines; some of the parts of the apparatus being shown in top plan and other parts omitted.

Fig. 10 is a view partly in rear elevation and partly in vertical section of the modified form of the device shown in Fig. 9, a portion of the refining apparatus being shown in broken lines.

Fig. 11 is a section on the line 11—11 of Fig. 10.

Fig. 12 is a vertical section through the gear housing and a portion of the chamber immediately thereabove with some of the parts located therein shown in elevation.

Fig. 13 is a view partly in side elevation and partly in vertical section showing some further modifications.

Fig. 14 is a sectional detail of the pawl lever and ratchet wheel shown in Fig. 13.

Fig. 15 is a plan view of the stabilizer with one of the shaft members shown in section.

Fig. 16 is a transverse section on the line 16—16 of Fig. 13.

Figure 1:
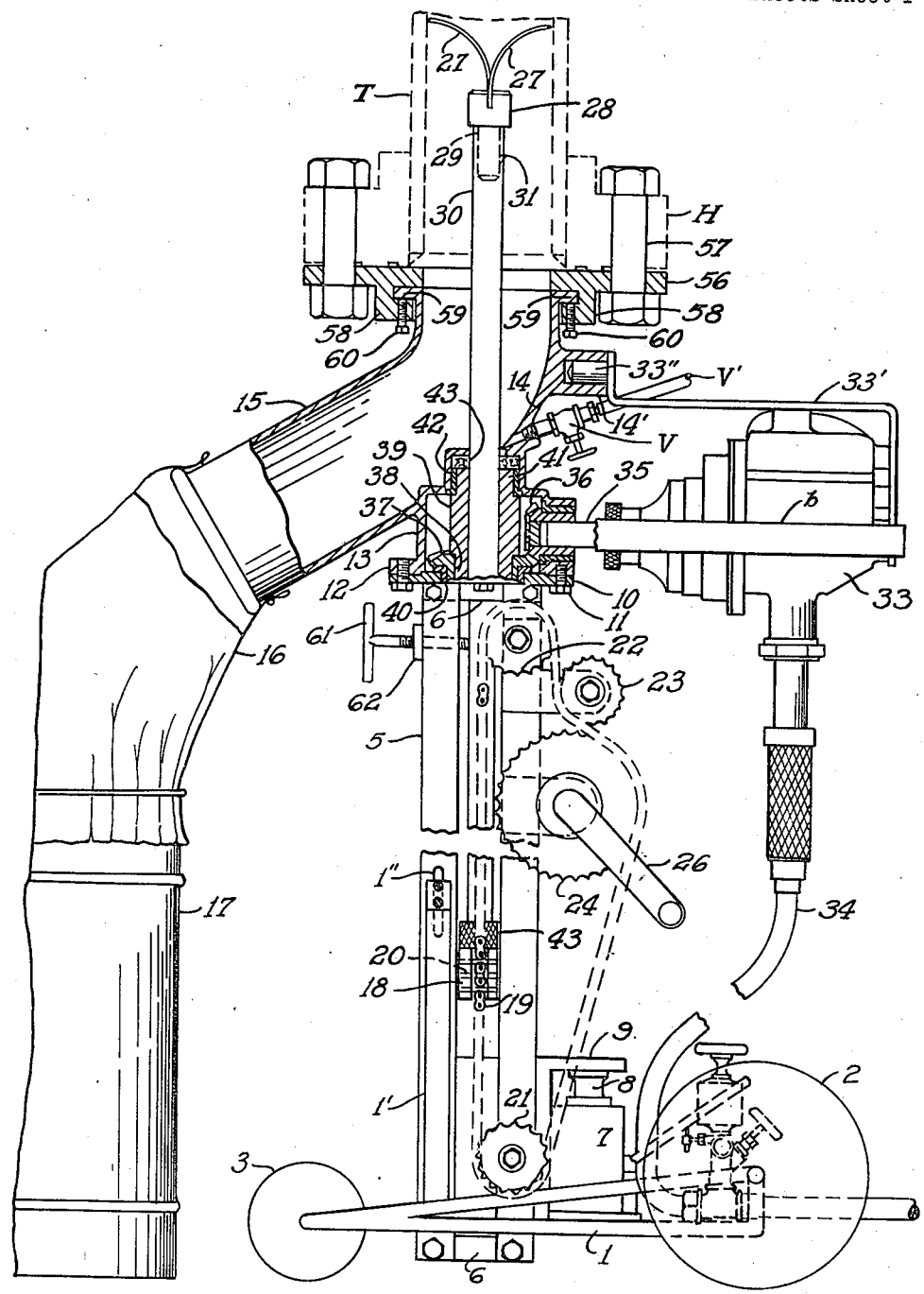
Fig. 1 is a view partly in side elevation and partly in longitudinal section of a tube cleaner embodying the improvements.

Referring to Figs. 1, 2, 3 and 4, 1 represents the frame of a supporting carriage which is mounted upon two rear wheels 2 and a smaller centrally disposed forward wheel 3. Mounted upon the carriage is a vertically disposed supporting frame for the cleaning apparatus, this frame in the present case consisting of a plurality of four spaced-apart uprights 5 (see also Fig. 7) connected together by a plurality of plates 6, and secured to the carriage frame 1 in any suitable way, preferably by braces 1' connected respectively to the carriage frame 1 and two of the frame members 5; each of the frame members 5 to which a brace is connected having a slotted opening 1'' which receives fastening devices such as bolts. A hydraulic jack 7 mounted upon the carriage frame 1 with its piston 8 engaging beneath a foot 9 secured to two of the members 5 is also preferably employed to assist in supporting the supporting frame of the apparatus and for raising the frame to a proper height to permit it to be connected to the tube or other container to be cleaned.

Secured to the upper ends of the frame members 5 is a circular plate 10 and secured to this plate 10 by bolts 11 is a flange 12 of a housing 13, this housing being preferably integrally formed with a chamber 14 which has leading therefrom a spout 15. The open end of this spout 15 has attached thereto when the apparatus is in operation a cover 16 of fabric or any other suitable material which in turn is secured to the upper end of a receptacle 17 which receives the disintegrated material dislodged by the cutting operation.

Slidably mounted in the frame members 5 is a crosshead 18 forming a part of the elevating or feeding apparatus for the shaft of the cutter. Each end of this head extends between two of the frame members 5 and is bifurcated to receive the links of a chain 19 and is connected with those links passing therethrough by any suitable fastening devices such as rivets 20. Each of these chains passes about a lower idler sprocket wheel 21, and two upper idler sprocket wheels 22 and 23 and thence about a sprocket wheel 24 which is secured to a shaft 25 which is rotatably mounted in the supporting frame 5 and has secured to each end thereof a hand crank 26 so that when the shaft 25 is rotated by the cranks the head 18 will be raised or lowered.

The cutting tool may be of any suitable form but is here shown as a cutter having two blades 27 secured to a head 28 which has a stem 29 which projects into one member 30 of a sectional shaft, the stem being removably attached to the shaft member in any suitable way but preferably by a spring catch 31 similar to the catch 32 shown in Fig. 3 and which will be later described.

For the purpose of driving the sectional cutter shaft there is employed a motor 33 shown in the present case as an air motor receiving air under pressure from the flexible conduit 34 which is connected with any suitable source of air under pressure, the motor being mounted on a bracket 33' which has a trunnion 33'' which fits into a hollow boss 14' projecting from the chamber 14. The motor also has rigid straps b secured thereto, which straps lie in channels c in the wall of the gear housing 13. One of the straps is locked to the gear housing by a spring-pressed plunger p which extends through a small housing h secured to the strap and also extends into an opening o in the wall of the gear housing 13. The plunger has a knob k on its outer end and a spring s is interposed between housing h and a flange f on the plunger p. This prevents the parts from being disengaged by vibration.

The reduced portion 35 of the shaft of this motor is square in cross-section and has removably secured thereto a beveled pinion 36 which has a square bore to receive the reduced portion 35 of the shaft. This pinion drives a beveled gear 37 which is connected in any suitable way with one trunnion 38 of a head 39. The hub of the gear 37 is journalled in a bushing 40 in the plate 10 and another trunnion 41 formed on the opposite end of the head is journalled in a bushing 42 located in a reduced portion of the housing with a gasket 43 interposed between the bushing and the end of the housing.

Each shaft member 30 is square in cross-section, as shown in Fig. 7, and the head and its trunnions are provided with similarly formed apertures to receive the shaft members so as to rotatably connect the shaft members with the head.

The sectional shaft consisting of the shaft members 30 is supported by the cross-head 18 in the manner illustrated best in Fig. 2 in which it will be seen that a knurled head 43 is provided with two oppositely extending stems 44 and 45. The stem 45 projects into a bushing 46 in the cross-head 18 and the stem 44 projects into the lower hollow shaft member 30 so that the shaft member 30 is either free to turn thereon or by friction exerted between the parts the head 43 and its trunnion 45 are free to rotate in the bushing.

The shaft sections are connected together in the manner illustrated in Fig. 3. One end of each shaft section has a stem 49 inserted therein, riveted thereto and projecting from the end thereof. This stem 49 has a transverse recess 50 in which is located the latch 32 previously referred to. Interposed between the latch and the rear wall of the recess is a coil spring 51 which normally presses the latch to latching position, the movement of the latch being limited by a pin 52 which extends into a slot 53 in the latch. Adjacent each end of each shaft member is an orifice 54 into which the latch is projected automatically to detachably connect two shaft members together. The outer end of the latch has a beveled face 55 so that when the two shaft members are to be connected together it acts as a cam surface upon which the wall of one shaft member rides so as to press the latch inwardly until it coincides with the orifice 54. These shaft sections may be of any desired length, depending upon the height of the space below the refining apparatus. The height of the frame member 5 is also correspondingly varied for the same purpose.

In order to connect the apparatus with the tube which is to be cleaned various means are employed depending upon the nature of the tube. One of these arrangements is shown in Figs. 1 and 2 and is adapted for a tube such as indicated in broken lines at T. Such a tube is equipped with a head indicated in broken lines at H. In order to connect the cleaning apparatus with such a head H there is employed an adapter plate 56 which is connected to the head H by bolts 57. This adapter plate has formed on the under side thereof two parallel slideways 58 the grooves of which receive flanges 59 formed on the upper end of the chamber 14, these flanges being slipped endwise into the grooves and held in position by set screws 60.

The operation of the apparatus as thus far described is as follows: A shaft member 30 is installed in the apparatus, the member being supported upon the cross-head 18 in the manner described and the upper end of the member having the cutter blades 27 secured to the upper end thereof. The cap of the tube to be cleaned is first removed from the head H and the cleaning apparatus secured to the head H through the medium of the adapter plate 56 after the frame 5 has been raised by the jack 7 to bring the adapter plate against the head H; it being understood that the upper ends of the braces 1' are temporarily loosened from the frame members 5 for this purpose. The motor 33 is then started to rotate the shaft member and the cutter and the shaft member gradually raised by rotating the shaft 25 through the medium of the cranks 26 so as to drive the chains 19. After the head 18 has been raised to the limit of its upper movement the motor is stopped, the shaft section locked by a set-screw 61 which extends through a threaded aperture in a plate 62 secured to two of the uprights 5, and the head 18 again lowered to the limit of its movement in the opposite direction by reversing the rotation of the shaft 25. Another shaft member 30 is then positioned on the head 18 and automatically locked to the initially installed shaft member immediately above it by raising the head 18 to cause the adjacent ends of the shaft members to telescope until the spring-pressed latch 33 carried by the lower member enters the orifice 54 of the upper member. The shaft 25 is then again rotated to further feed the cutter into the tube which is being cleaned.

This operation is repeated until all the material in the tube has been removed. The disintegrated material drops by gravity into the chamber 14 and passes out of the spout 15 and into the receptacle 17. The chamber 14 is provided with a jet opening to receive a valve v of any suitable construction which controls a supply line v' leading from a suitable source of air under pressure so that a jet of compressed air may be projected into the chamber 14 to relieve any clogging of the loosened material.

In order to remove the cutter shaft from the tube or other container after the material has been displaced therefrom, the preferred method is to attach a line to the cutter shaft at the upper end of the refining apparatus so that the shaft may be limited to an extent to close the shaft from the cleaning apparatus, disconnect the cleaning apparatus from the refining apparatus and then lower the shaft and disconnect the members thereof by pressing in on the latch 32.

In Figs. 5, 6, 7 and 8 are shown some modifications. All of the parts which are common to the construction shown in Figs. 1, 2, 3 and 4 are given the same reference characters with the addition of the exponent $a$. Instead of using chains to raise and lower the head 18a, cables are employed for that purpose, one of which is shown at 63, wrapped around a pulley 64 fast to a shaft 65 which is turned by the cranks 66. The cable passes about upper and lower idler pulleys 67 and 68 and the cable is attached to the elevator cross-head 18a by U-shaped clamps 69 which encircle the cable and pass through lugs 70 on the head, with an interposed plate 71 placed between the bights of the clamps and the cable. But one set of raising and lowering devices are shown in Fig. 5 but it will be understood that two sets of these devices will preferably be employed as in Figs. 1 and 2.

A modification of the manner of locking the sectional cutter shaft members while an additional shaft member is being inserted is employed in this modification. Referring particularly to Figs. 7 and 8, 72 represents two brackets which are secured to the frame members 5a. These brackets carry a rotatable shaft 73 which has a crank arm 74. Secured to this shaft is a cam 75 which acts upon a clamping member in the form of a yoke 76 which may encircle any one of the shaft members 30a, the cam cooperating with a cross-bar 77 carried by the yoke. The yoke has a stem 78 which extends through a plate 79 carried by two of the frame members 5a and a coil spring 80 surrounds this stem and is interposed between the plate 79 and a nut 81 threaded on the stem to normally hold the yoke disengaged from the shaft member 30a. The bight of the yoke 76 is preferably serrated as shown to furnish a better engagement with the shaft member 30a, and each leg of the yoke has a slot shown by dotted lines at 76' to receive the shaft 73 and compensate for relative movement between the shaft 73 and the yoke.

In Fig. 5 is shown a different form of tube that is to be cleaned, the tube being indicated at Ta and its head at Ha. In this case the head Ha extends a considerable distance below the end of the tube in order to provide for a port opening indicated at $h'$. In order to connect the apparatus to this type of tube there is provided an elongated adapter 85 of a length which will extend to the lower end of the tube; this adapter being externally threaded as indicated at 86 to permit it to be screwed into the internal threads of the head Ha which normally receive the plug (not shown) which closes the head in the use of the refining apparatus. The lower end of the adapter is provided with two slideways 87 which receive the flange 59a on the upper end of the chamber 14a, set-screws 60a impinging upon the flange to hold it in position. This adapter acts to protect the plug seat and the port opening from the dust resulting from the cutting operation.

In Figs. 9, 10 and 11 there are shown some further modifications. All of the parts which are common to the construction shown in Figs. 1, 2, 3 and 4 are indicated by the same reference characters with the addition of the exponent $b$.

One of the modifications resides in the manner of connecting the apparatus with the tubes which are to be cleaned. In this modification the refining apparatus is shown as having a plurality of catalyst tubes Tb, the lower ends of which are supported by a tube sheet S, the tubes extending slightly below the upper surface of the sheet. In order that the cleaning apparatus may be readily moved from one tube to another the apparatus instead of being supported on a floor carriage is hung upon a circular overhead track 90 in a way which will permit the apparatus to be brought in alignment with any one of the tubes. This track is attached to a lower flange F of the casing C of the refining apparatus by a plurality of brackets 91 which are permanently attached to the track and removably secured to the flange by bolts 92; the track being supported so as to be in concentric relation with the vertical center of the refining apparatus. A beam consisting of two L-shaped members 93, connected together at their ends by brackets 94, is mounted upon the track 90 through the medium of rollers 95, the rollers being journalled upon headed pins which are secured to the brackets, the rollers being mounted between the brackets and the heads 96 of the pins and the pins locked to the brackets by the nuts 97. The cleaning apparatus is slidably mounted upon the beam and to that end the housing or chamber 14b has a hollow extension 98 provided with oppositely extending lateral flanges 99 to which are secured guideways 100 which receive the beam members 93; a set-screw 101 being provided to hold the cleaning apparatus in any desired position in the length of the beam. Slidably mounted upon this extension 98 is a tubular member 102, which after the cleaning apparatus is installed, may be slid upwardly on the extension 98 so as to telescope that portion of the tube Tb which projects below the tube sheet. This tubular member 102 is locked to the extension 98 by a set-screw 103 after it has been properly positioned and may be slid down upon the extension by releasing the set-screw far enough to let it clear the tube T' when it is desired to move the cleaning apparatus from one tube to another by rotating the beam upon the track or by sliding the cleaning apparatus upon the beam or both.

In Figs. 13, 14, 15 and 16 there are shown some further modifications and additions. All of the parts which are common to the construction heretofore described are indicated by the same reference characters with the addition of the exponent c.

In Figs. 13 and 15 there is illustrated a stabilizer for the cutter shaft. This stabilizer consists of a cross-head 104 which has a squared bore to receive the uppermost shaft member 30c, the cross-head being removably secured to this shaft member in any suitable way such as by the set-screw 105. Each end of the cross-head is recessed and carries a pin 106, upon which pins are journalled rolls 107 which enter the recesses. These rolls are located in comparatively close proximity to the walls of the tube Tc which is being cleaned and act to guide the shaft and the cutter 27c through the tube and prevent undue vibration.

The means for locking the shaft sections in elevated position while the new shaft section is being installed is the same as that illustrated in Figs. 7 and 8 with the exception that a ratchet wheel 108 is attached to the shaft 73c which carries the cam 75c which locks the yoke 76c to the shaft member 30c. A gravity-operated pawl 109 having a handle 110 engages with the teeth of the ratchet wheel to prevent retrograde movement of the cam due to jar.

In order to elevate the cutter shaft by a step-by-step movement, a pawl lever 111 is loosely mounted upon the hub of a ratchet wheel 112, the ratchet wheel being mounted upon a squared portino 113 of the shaft 25c; the crank lever having a spring-pressed pawl 114 to engage with the teeth of the ratchet wheel so that a step-by-step movement may be imparted to the shaft. Another ratchet wheel 115 is secured to the shaft and a gravity-operated holding pawl 116 pivotally mounted on one of the frame members 5c is adapted to engage the teeth of this ratchet wheel 115 to maintain the cutter shaft in elevated position when the lever 111 is being returned for a fresh stroke.

In this modified construction the parts are carried by a floor carriage, the frame of which is indicated at 1c. The rear end of this carriage is mounted upon a pair of carrying wheels (not shown) and the front end is carried by a single wheel 3c mounted in the yoke 117 which is swivelly connected in any suitable way with the head 118 carried by the forward end of the carriage frame. In this case the frame members 5c are dropped below the carriage 1c as is also the lower idler sprocket wheel 21c.

Having thus described my invention, I claim:

1. In an apparatus to dislodge material from a container for said material, a supporting frame, a shaft having a plurality of members, means for detachably connecting the members of said shaft, means to rotate said shaft, a cutter driven by said shaft, feeding mechanism for said shaft, a chamber supported by said frame through which said shaft extends, and means for detachably connecting said chamber with the container for the material to be dislodged consisting of an adapter plate adapted to be removably connected with the container and having slideways, and flanges on said chamber entering said slideways.

2. In an apparatus to dislodge material from a container for said material, a supporting frame, a shaft having a plurality of members, means for detachably connecting the members of said shaft, means to rotate said shaft, a cutter driven by said shaft, feeding mechanism for said shaft, a chamber supported by said frame through which said shaft extends, an adapter, and means for detachably connecting said chamber with said adapter, said adapter having an extension adapted to project into the container for the material and having a threaded connection therewith.

3. In an apparatus to dislodge material from a container for said material, a supporting frame, an elevator mechanism consisting of a head slidably mounted in said frame, a manually operated rotatable shaft carried by said frame, a pair of sprocket wheels carried by said shaft, sprocket chains driven by said sprocket wheels connected with said head, idler sprockets about which each chain passes, one of which is located above the corresponding driven sprocket wheel and the other at the lower end of said frame, a cutter shaft having a plurality of detachable members, said cutter shaft being rotatably mounted on said head, power means to rotate said shaft, and a cutter driven by said shaft.

4. In an apparatus to dislodge material from a container for said material, a supporting frame, an elevator mechanism consisting of a head slidably mounted in said frame, a manually operated rotatable shaft carried by said frame, a pair of pulleys carried by said shaft, cables driven by said pulleys connected with said head, idler pulleys about which each cable passes, one of which is located above the corresponding driven pulley and the other at the lower end of said frame, a cutter shaft having a plurality of detachable members rotatably mounted on said head, power means to rotate said cutter shaft, and a cutter driven by said cutter shaft.

5. In an apparatus to dislodge material from a container for said material, an elongated supporting frame, elevating mechanism carried by said frame comprising a head slidably mounted in said frame, a cutter shaft having a plurality of members, means for detachably connecting the members of said shaft end to end, means to rotate said shaft, a cutter driven by said shaft, elevating mechanism for said shaft comprising a permanently non-rotatable head slidably mounted in said supporting frame upon which said saft is rotatably mounted, and means to temporarily lock said shaft to said frame to permit said head to be lowered and a new shaft member installed, said locking means consisting of a member surrounding said shaft, a spring to hold said member normally disengaged from said shaft, and a manually operated cam to throw said member into clamping relation with said shaft.

6. In an apparatus to dislodge material from a container for said material, a vertically arranged supporting frame, a cutter shaft having a plurality of members, means for detachably connecting the members of said shaft, means to rotate said shaft, a cutter driven by said shaft, means to feed said shaft and cutter into the material to be dislodged from the container, an overhead horizontal circular track together with means to removably connect the same with the container, and means for supporting said frame on said track.

7. In an apparatus to dislodge material from a container for said material, a supporting frame, a cutter shaft having a plurailty of members, means for detachably connecting the members of said shaft, means to rotate said shaft, a cutter driven by said shaft, means to feed said shaft and cutter into the material to be dislodged from the cotnainer, an overhead horizontal circular track together with means to removably connect the same with the container, and means for supporting said frame on said track, said means comprising a beam, rollers for supporting said beam on said track, and means for supporting said frame from said beam for lateral adjustment with respect thereto.

8. In an apparatus to dislodge material from a container for said material, a supporting frame, a cutter shaft having a plurality of members, means for detachably connecting the members of said shaft, means to rotate said shaft, a cutter driven by said shaft, means to feed said shaft and cutter into the material to be dislodged from the container, an overhead horizontal circular track together with means to removably connect the same with the container, and means for supporting said frame on said track, said means comprising a beam, rollers for supporting said beam on said track, and means for supporting said frame from said beam for lateral adjustment with respect thereto, said latter means comprising guideways connected with said frame and slidably mounted upon said beam and a set-screw to hold at least one of said guideways locked to said beam in different positions of adjustment.

GROVER F. ILGEN.